(12) United States Patent
Bodmer et al.

(10) Patent No.: US 6,362,932 B1
(45) Date of Patent: Mar. 26, 2002

(54) DISK DRIVE SPINDLE AIR BEARING WITH FEATURES TO IMPROVE START-STOP PERFORMANCE

(75) Inventors: Jim Bodmer, Longmont, CO (US); Shuo-Hao Chen, Cupertino, CA (US); Shane Walker, Westminster, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/347,989

(22) Filed: Jul. 6, 1999

(51) Int. Cl.[7] ............................................. G11B 17/02
(52) U.S. Cl. .................................................. 360/99.08
(58) Field of Search ........................... 360/99.08, 98.07, 360/99.04; 310/90; 384/107, 114

(56) References Cited

U.S. PATENT DOCUMENTS

| | | | |
|---|---|---|---|
| 5,430,590 A | | 7/1995 | Ainslie et al. ............ 360/98.07 |
| 5,536,088 A | * | 7/1996 | Cheever et al. ............. 384/107 |
| 5,770,906 A | * | 6/1998 | Hazelton et al. ............... 310/90 |
| 5,795,072 A | | 8/1998 | Hwang ......................... 384/100 |
| 5,822,846 A | | 10/1998 | Moritan et al. ................ 25/598 |
| 6,059,459 A | * | 5/2000 | Ichiyama ..................... 384/112 |
| 6,157,515 A | * | 12/2000 | Boutaghou ............... 360/99.08 |

* cited by examiner

Primary Examiner—George J. Letscher
(74) Attorney, Agent, or Firm—Sheridan Ross P.C.

(57) ABSTRACT

A disk drive spindle air bearing includes an air bearing gap between a pair of air bearing surfaces that varies as a function of radial distance from an axis of rotation. This non-uniform air bearing gap effectively minimizes contact between the air bearing surfaces of the bearing when the disk drive hub is at rest or spinning below a threshold speed. This reduced contact significantly reduces the stiction forces that must be overcome during disk drive spin up operations and also reduces the generation of wear particles within the bearing. Air bearing surface shaping techniques are provided for achieving the non-uniform gap dimension, including techniques involving crowned, stepped, and sloped surfaces. In an alternative approach, sacrificial plating is employed to achieve a non-uniform gap dimension within the air bearing.

35 Claims, 6 Drawing Sheets

DISK DRIVE SPINDLE AIR BEARING WITH FEATURES TO IMPROVE START-STOP PERFORMANCE

FIELD OF THE INVENTION

The invention relates generally to disk drive spindle motors and, more particularly, to air bearings for use in connection with disk drive spindle motors.

BACKGROUND OF THE INVENTION

A disk drive is a data storage device that stores information within one or more tracks of a disk shaped data storage medium (i.e., a disk). The data is read from the disk by spinning the disk about an axis of rotation while directing a transducer toward the area of the disk having the desired data. The transducer senses the desired data from the disk and generates an analog read signal in response thereto. The analog read signal is then converted into a digital format for use by a host computer coupled to the disk drive.

A typical disk drive includes one or more disks that are mechanically coupled to a hub. The hub, in turn, is coupled to a spin motor which provides the rotational forces necessary for imparting motion to the hub and the disk(s). To reduce friction in the disk drive and enhance stable rotation of the hub, among other things, any of various bearing structures can be used at the bearing between the moving and stationary portions of the disk drive. Structures that provide bearing support in a direction parallel to the axis of rotation are known as thrust bearings and structures that provide bearing support in a radial direction with respect to the axis of rotation are known as journal bearings. Historically, hardened spherical balls (i.e., ball bearings) have been used to reduce friction in both of these directions. More recently, however, air bearings have become popular for achieving bearing stability and reduced friction in disk drives.

Air bearings rely upon self-generated pressurized air in the bearing region to prevent contact between the bearing surfaces during disk rotation. As such, air bearings normally generate significantly less friction during full speed disk operation than do ball bearings. In addition, air bearings eliminate ball and race defects which cause non-repeatable runout. This results in less non-repeatable spindle run out and, correspondingly, less transducer position error. By decreasing position error, air bearing use effectively increases the density with which data can be stored on the disk in the radial direction.

A problem with air bearings occurs when the disk is just beginning to rotate. That is, before the disk reaches a threshold rotational velocity, the air pressure in the bearing region is low and is thus not capable of adequately supporting the rotating portion of the drive. The air bearing surfaces of the thrust bearing, therefore, come in contact with one another during these periods on non-rotation or low speed rotation. In addition, when the disk is at rest, the air bearing surfaces of the thrust bearing can stick together in a phenomenon known as "jo-blocking" or "stiction". This "stiction" between bearing surfaces must be overcome by the spin motor before the disk can spin up and, therefore, can place a large load on the spin motor during disk drive initialization. This increased load on the spin motor can contribute to a shortened life span for the motor. In addition, friction between the air bearing surfaces during spin up and spin down can generate wear particles that become trapped in the bearing area during operation. If these wear particles are allowed to build up, they can eventually compromise the operation of the bearing and could possibly lead to bearing seize up.

Therefore, there is a need for an air bearing structure for use in a disk drive that produces relatively little stiction during an initial disk spin-up period. In addition, there is a need for an air bearing structure that is capable of reducing the generation and collection of wear particles in the bearing area.

SUMMARY OF THE INVENTION

The present invention relates to an air bearing structure for use in a disk drive device that produces relatively little stiction between air bearing surfaces during an initial disk spin up period. In general, the structures of the present invention are designed to minimize contact between the air bearing surfaces of the bearing when the hub of the disk drive is at rest or rotating below a threshold velocity. This minimization of contact is accomplished with relatively little effect on the performance of the air bearing. The inventive structures also provide for a significant reduction in the collection of wear particles in the air bearing region. The principles of the present invention can be used in virtually any form of disk drive device, including magnetic disk drives, optical drives, and other data storage devices utilizing a disk shaped medium.

In accordance with the present invention, reduced contact between thrust bearing surfaces is achieved by appropriately shaping the bearing surfaces. Air bearings of the past typically parallel thrust bearing surfaces in the air bearing region to achieve the necessary lift. Consequently, the gap height of these prior thrust bearings is constant as a function of radial distance from the axis of rotation. In accordance with the present invention, the bearing surfaces of the thrust bearing are shaped such that the height of the gap between the bearing surfaces varies as a function of radial distance. This non-uniform gap height exists while the disk is at rest and also when the disk is rotating at full operational speed (and at all speeds in between). Therefore, contact between the air bearing surfaces during reduced velocity operation is limited to a small portion of the overall surface areas of the air bearing surfaces. The reduced contact area also generates considerably less stiction on subsequent spin up of the disk than would a parallel plate configuration.

Various bearing surface shaping techniques are provided in accordance with the present invention. In one approach, one or both of the air bearing surfaces in the thrust bearing are "crowned" (i.e., given the shape of a section of a sphere surface). In another approach, stepped or sloped bearing surfaces are used. In yet another approach, sacrificial plating is used to achieve a non-uniform gap height in the radial direction. That is, one or both of the air bearing surfaces within the thrust bearing are plated over a portion of their total areas so that only the plated portion of the surface contacts the opposing air bearing surface when the disk is at rest. In a preferred implementation of the sacrificial plating approach, the plating is arranged in a ring configuration on the air bearing surface. The sacrificial plating is preferably formed using a material that is softer than the material used for the air bearing surfaces themselves.

In another aspect of the present invention, structures are provided for preventing the collection of friction generated wear material in the thrust bearing region. More specifically, groove patterns are provided for use in the thrust bearing that pump air radially outward over most or all of the thrust bearing region. These outward air currents tend to blow any wear particles within the bearing region outward toward the outer diameter of the bearing. wear particle collection functionality is also provided for collecting the wear particles after they have been ejected from the thrust bearing. In one embodiment, for example, a cavity is provided for catching the ejected wear particles. In another embodiment, an adhesive and/or magnetic material is provided for holding the particles after they have been ejected. By capturing the ejected particles after they have been blown from the bearing, the particles are prevented from making their way to other areas of the disk drive where they can have a negative impact on disk drive performance.

DETAILED DESCRIPTION OF A PREFERRED EMBODIMENT

Figure 1:
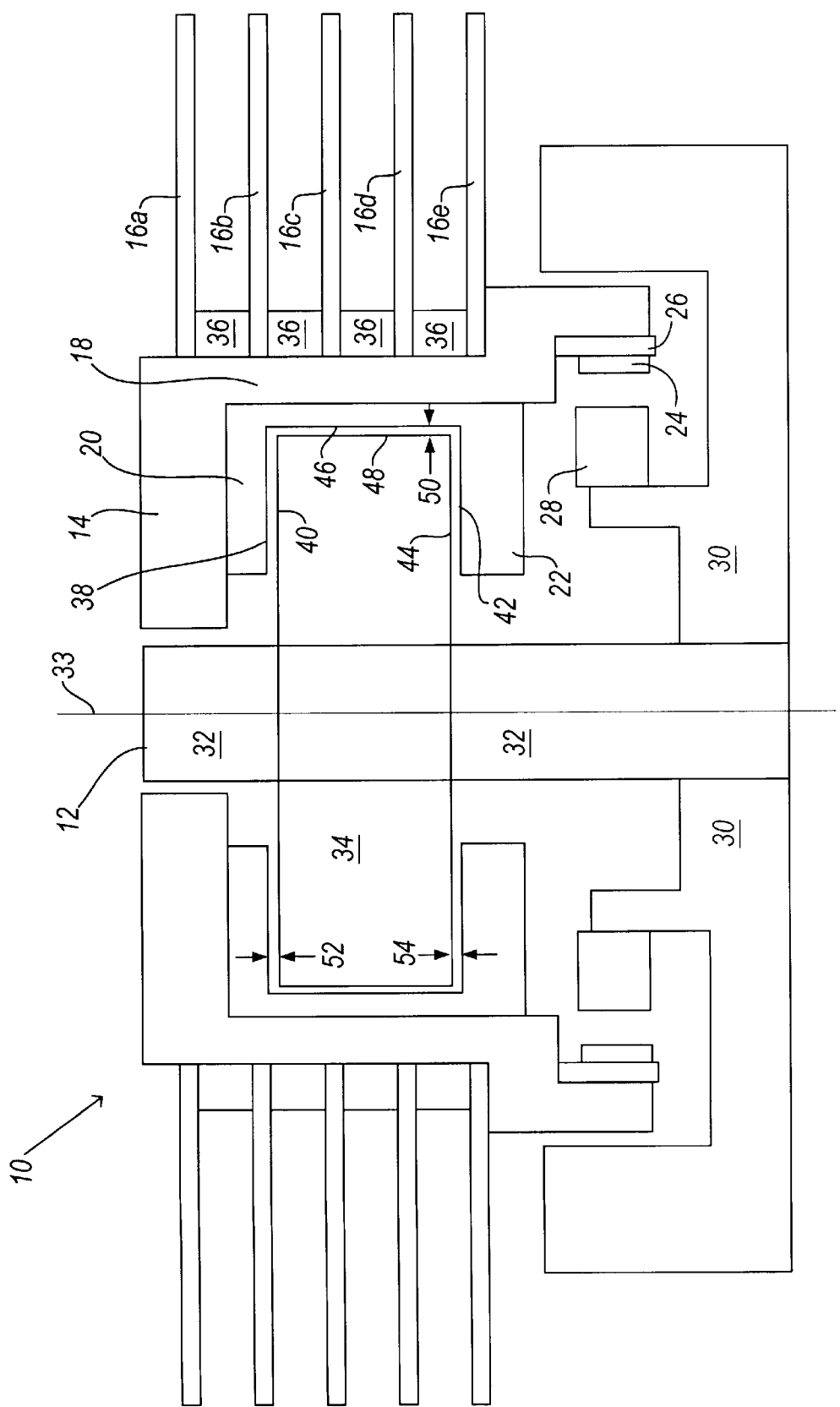
FIG. 1 is a cross sectional side view of a disk drive that can utilize the principles of the present invention.

FIG. 1 is a cross-sectional side view of a disk drive that can be modified in accordance with the principles of the present invention. As illustrated, the disk drive 10 includes: a shaft 12, a hub 14, a plurality of disks 16a–16e, a sleeve 18, an upper thrust plate 20, a lower thrust plate 22, a plurality of magnets 24, a plurality of back irons 26, a plurality of coils 28, and a base 30. The hub 14 is a rigid structure that holds the disks 16a–16e in substantially fixed positions with respect to one another. As shown, the disks 16a–16e are placed around an outer diameter of the hub 14 where they are clamped in place. Spacers 36 are placed between the disks 16a–16e on the hub 14 to create adequate space between the disks 16a–16e to permit insertion of one or more transducers between each pair of disks for use in, for example, reading data from the disks 16a–16e.

The shaft 12 is a multi-sectioned cylindrical member about which the hub 14 and the disks 16a–16e rotate during operation of the disk drive 10. The shaft 12 is affixed to and extends upwardly from the base 30 of the disk drive. In the illustrated embodiment, the shaft 12 includes two small diameter portions 32 and a large diameter portion 34, all of which are cylindrical in shape. The shaft 12 includes a central vertical axis 32 which acts as the axis of rotation of the hub 14. The sleeve 18 is a hollowed cylindrical structure that is fixedly attached to the hub 14 within an internal void of the hub 14. The sleeve 18 envelopes the large diameter portion 34 of the shaft 12 and has an inner diameter that is slightly larger than the diameter of the large diameter portion 34 to allow the sleeve 18 and the attached hub 14 to rotate freely about the shaft 12. The sleeve 18 has an inner surface 46 that opposes an outer surface 48 of the large diameter portion 34 of the shaft 12.

Also attached within the internal void of the hub 14 are the upper and lower thrust plates 20, 22. The upper thrust plate 20 includes a surface 38 that opposes an upper surface 40 of the large diameter portion 34 of the shaft 12. Similarly, the lower thrust plate 22 includes a surface 42 that opposes a lower surface 44 of the large diameter portion 34 of the shaft 12. The distance between the surface 38 of the upper thrust plate 20 and the surface 42 of the lower thrust plate 22 is chosen to provide a desired gap between each surface 38, 42 and a corresponding surface 40, 44 of the large diameter portion 34 of the shaft 12 during operation of the disk drive 10.

As illustrated in FIG. 1, the magnets 24 are each attached to the hub 14 via a corresponding back iron plate 26. The purpose of the back iron plate 26 is to complete the magnetic circuit of the magnets 24. The coils 28 are mounted to the base 30 in a manner that opposes the magnets 24 when the hub 14 is in predetermined rotational positions. During operation of the disk drive 10, the coils 28 are pulsed in a predetermined manner to initiate and maintain the rotation of the hub 14 about the shaft 32. Although not shown, a speed control unit is generally used to maintain the hub 14 at a desired rotational speed during read and/or write operations.

During rotation of the hub 14 about the shaft 12, a journal air bearing is formed in the gap 50 between the inner surface 46 of the sleeve 18 and the outer surface 48 of the large diameter portion 34 of the shaft 12. This journal air bearing acts to align the centers of the hub 14 and the shaft 12 so that substantially constant journal bearing gap width results about the circumference of the large diameter portion 34 of the shaft 12. Similarly, thrust air bearings are formed in the gaps 52, 54 between the upper and lower surfaces 40, 44 of the large diameter section 34 of the shaft 12 and the corresponding surfaces 38, 42 of the upper and lower thrust plates 20, 22. The thrust air bearings act to center the large diameter portion 34 of the shaft 12 between the surface 38 of the upper thrust plate 20 and the surface 42 of the lower thrust plate 22.

The air bearings described in the previous paragraph only exist when the hub 14 is rotating about the shaft 12 at a rotational velocity that is fast enough to generate the pressure required to support the motor load. In general, at least one surface in each of the bearing regions will include grooves etched, milled, machined, or otherwise created therein to generate the required pressure in response to the spinning action of the hub 14. In effect, the rotating grooves act as an air pump that increases the pressure within the relatively narrow gap in the bearing region. The increased air pressure keeps the opposing surfaces in the bearing region separated so that they do not rub against one another during rotation. Similar pressure on opposite sides of the shaft 12 ensures that the spacing between the opposing surfaces in the bearing region (e.g., the gap width or height) does not exceed a desired dimension.

When the hub 14 is at rest or rotating below a threshold speed, the air bearings in the disk drive 10 disappear. Consequently, the surface 38 of the upper thrust plate 20 comes to rest on the upper surface 40 of the large diameter section 34 of the shaft 12. As can be appreciated, the contact between surfaces that results can cause a considerable amount of friction and wear. In addition, once at rest, the surfaces tend to stick together (i.e., stiction occurs) making a subsequent spin up of the disk drive more difficult. In conventional air bearings, the opposing surfaces in the air bearing regions are generally very hard, smooth, parallel surfaces. Parallel surfaces are chosen to achieve a substantially uniform pressure distribution in the bearing region. However, the parallel nature of the surfaces results in maximum contact between the surfaces when the air bearing is not present between the surfaces. For example, with reference to FIG. 1, when the air bearing is removed from the gap 52, there will be maximum contact between the surface 38 of the upper thrust plate 20 and the upper surface 40 of the large diameter shaft portion 34 if the surfaces are parallel. In conceiving of the present invention, it was appreciated that stiction effects and wear particle generation in the bearing regions could be reduced by minimizing contact between the air bearing surfaces when the hub 14 is moving slowly or at rest. A number of techniques are provided for achieving this reduction.

Figure 2:
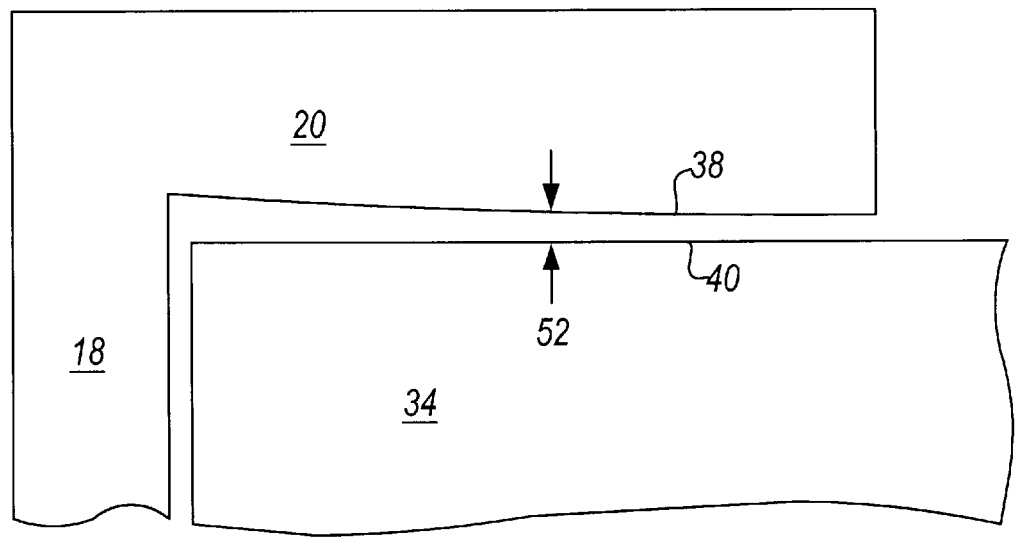
FIGS. 2–5 are sectional side views of various air bearing gap arrangements in accordance with the present invention.

FIG. 2 is a close-up cross-sectional side-view of the gap 52 between the surface 38 of the upper thrust plate 20 and the upper surface 40 of the large diameter shaft portion 34 in accordance with one embodiment of the present invention. As illustrated, the surface 40 of the large diameter shaft portion 34 is substantially flat while the surface 38 of the thrust "crowned" (i.e., substantially spherical in shape). This crowning creates a situation where the height of the gap 52 gradually increases with increased radial distance from the axis of rotation 32. Because the surface 38 is crowned, contact between the surfaces 38, 40 when the hub 14 is at rest occurs along a circular line rather than over the entire corresponding surface portions of the two surfaces 38, 40. In an alternative approach, the crowning can be applied to the surface 40 instead of the surface 38, or crowning to both surfaces can be used.

Figure 3:
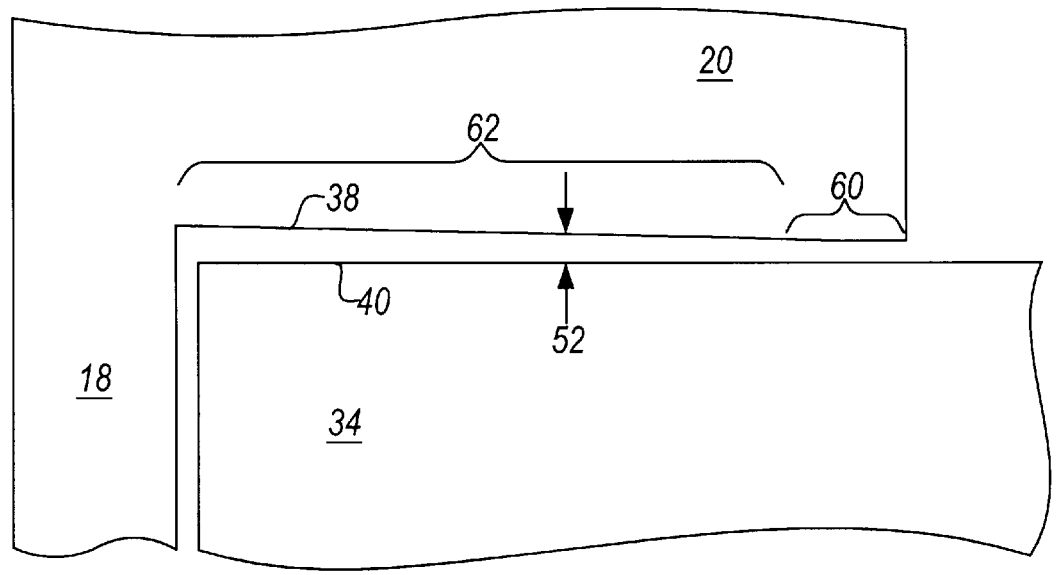

The above described technique for reducing contact between bearing surfaces is not limited to use of spherical surfaces. For example, FIG. 3 illustrates an embodiment where the surface 38 includes a substantially flat portion 60 toward the inner diameter of the upper thrust plate 20 and a substantially straight sloped portion 62 over the remainder of the surface 38. The flat portion 60 is substantially parallel with the upper surface 40 of the large diameter shaft portion 34 and thus will contact the surface 40 when the hub 14 is at rest. The sloped portion 62 of the surface 38 will not contact the surface 40. As can be appreciated, the flat portion 60 can be made as narrow as possible to effectively minimize contact between the surfaces. In addition, the slope of the sloped portion 62 can be minimized to ensure an adequate amount of air pressure in the gap 52 during hub rotation. As before, the surface shaping can alternatively (or additionally) be applied to the shaft surface 40.

Figure 4:
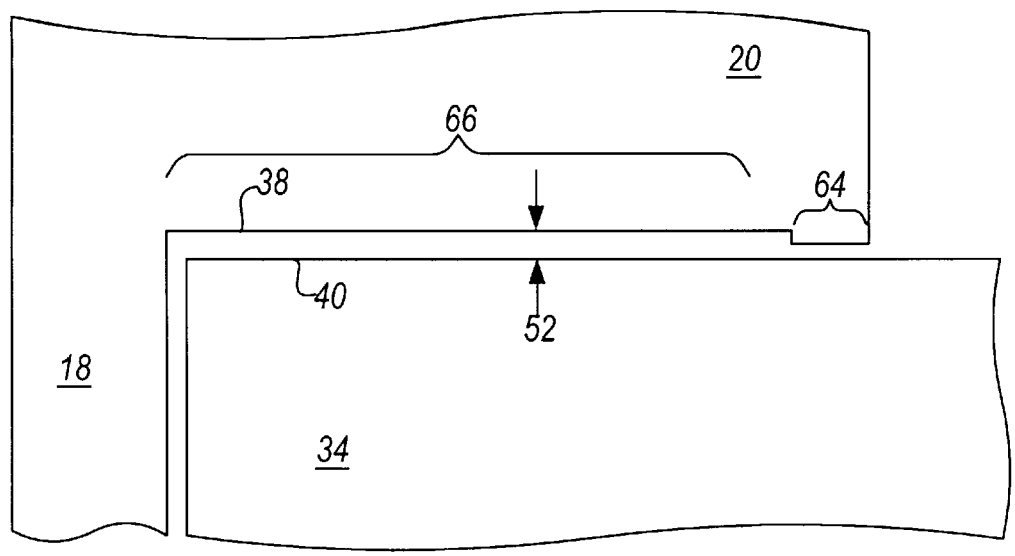

FIG. 4 illustrates a stepped approach for achieving reduced surface contact in the bearing region in accordance with the present invention. That is, the surface 38 includes a substantially flat step portion 64 adjacent to another substantially flat step portion 66. The first step portion 64 is lower than the second step portion 66 and thus will contact the surface 40 when the hub 14 is at rest. Alternatively, the step 64 can be located on the upper surface 40 of the large diameter shaft portion 34. It should be appreciated that the contact point in each of the described embodiments can be located at virtually any radial point along the bearing surface. However, it is preferable that the contact point occur as close to the axis of rotation as possible as these inner regions experience less surface velocity, and hence generate less friction, than the outer diameters.

Figure 5:
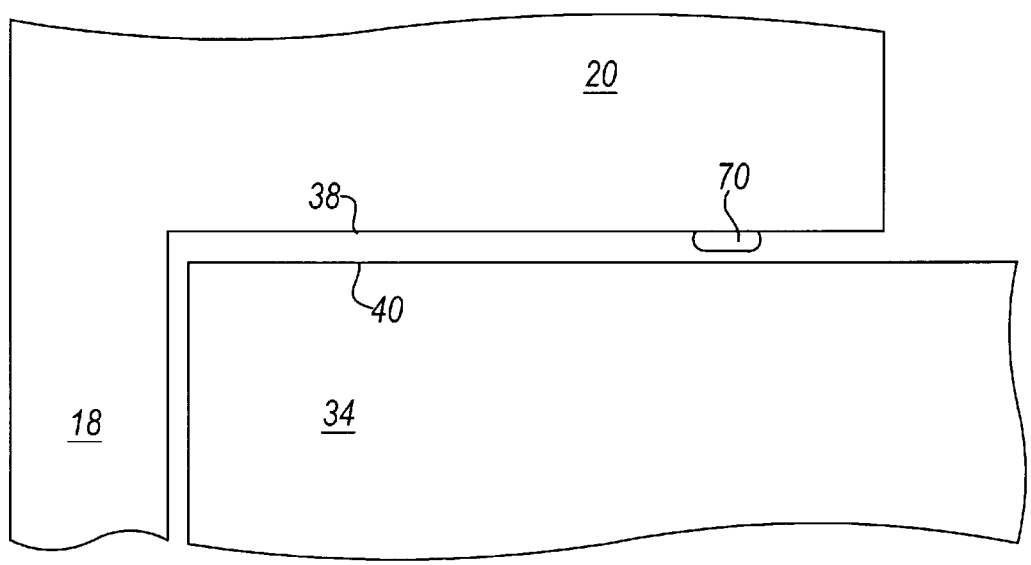

FIG. 5 illustrates a technique using sacrificial plating to reduce surface contact in the bearing region. As illustrated, plating 70 is applied to the surface 38 in a limited area within the bearing so that only the plating 70 contacts the surface 40 when the hub 14 is at rest. The plating 70 can alterna-tively for additionally) be applied to the upper surface 40 of the large diameter shaft portion 34. The material used for the plating 70 will preferably be softer than the material used for the opposing surface so that the plating will wear at a faster rate than the opposing surface. Shafts and thrust plates are commonly fabricated using relatively hard materials such as steel and ceramics. Consequently, possible sacrificial plating materials include softer metals such as nickel. The plating 70 can be applied to the air bearing surface by any of a number of plating processes, such as sputtering, electroplating and other electrodeposit techniques, lithography techniques, or other similar techniques. In one embodiment of the invention, a combination of sacrificial plating and other surface shaping is utilized.

Figure 6:
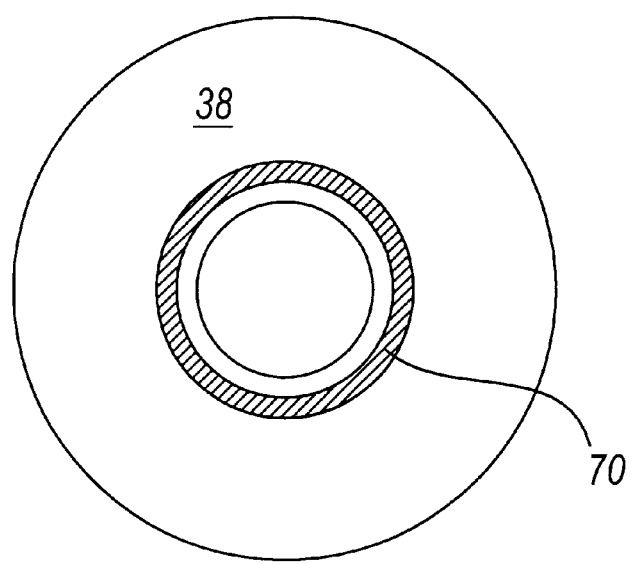
FIG. 6 is a bottom view of a thrust plate surface showing a sacrificial plating configuration in accordance with one embodiment of the present invention.
Figure 7:
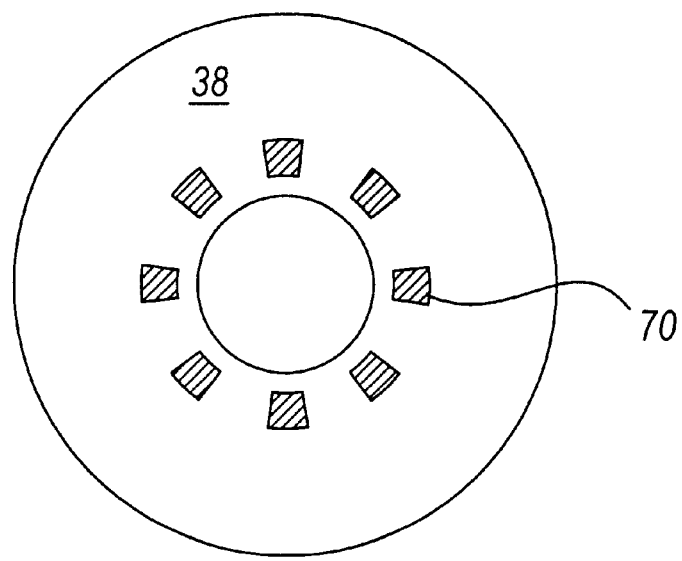
FIG. 7 is a bottom view of a thrust plate surface showing a sacrificial plating configuration in accordance with another embodiment of the present invention.

FIG. 6 is a bottom view of the surface 38 showing the orientation of the sacrificial plating 70 in one embodiment of the present invention. As shown, the plating 70 forms a concentric ring on the surface 38. FIG. 7 illustrates an alternative approach where the concentric ring of plating is broken up into segments that are distributed at equal angular positions on the surface 38. By distributing the plating in this matter, even further reduction in contact is achieved. In one embodiment of the invention, the plating 70 takes the form of a circular arrangement of angularly spaced plating bumps. It is preferable that at least 4 equally spaced plating bumps be provided to achieve balance in the bearing. Similar techniques for breaking up the bearing contact portions in azimuth can be applied in the embodiments of the invention illustrated in FIGS. 2–4 by properly shaping the corresponding air bearing surfaces.

As described previously, at least one of the two opposing surfaces of an air bearing will include a pressure producing groove pattern to generate the pressure required in the corresponding gap. In the past, herringbone groove patterns were generally used that drew air in at each end of the bearing to a pressure concentration point somewhere in the middle of the bearing region. For example, in a thrust bearing application, the herringbone pattern would include a first set of grooves located toward the outer diameter of the bearing to draw air radially inward in the bearing and a second set of grooves toward the inner diameter of the bearing to force air radially outward in the bearing. The two air currents would meet at an intermediate radial position in the bearing to create an enhanced pressure zone.

Figure 8:
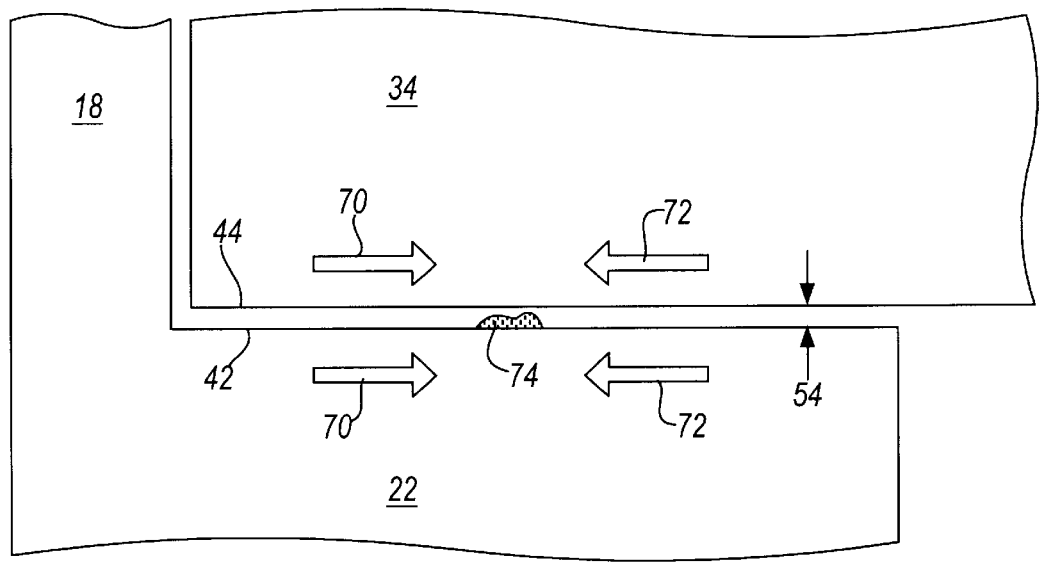
FIG. 8 is a sectional side view of an air bearing gap utilizing a herringbone groove pattern that results in collection of wear particles in a central location within the gap.
Figure 9:
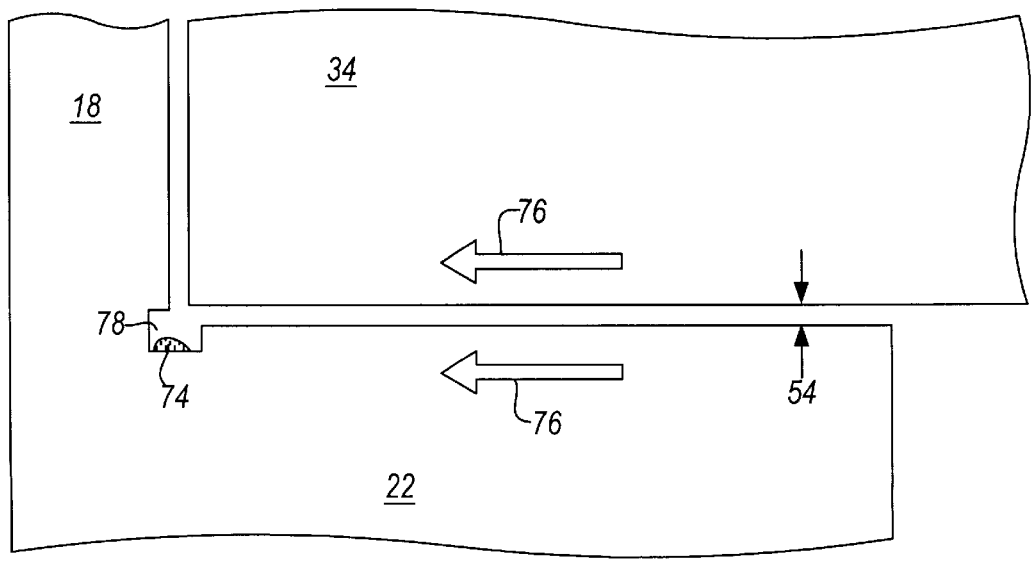
FIGS. 9 and 10 are sectional side views of an air bearing gap utilizing an outward pumping groove pattern in accordance with the present invention to facilitate collection of wear particles in a cavity outside the air bearing gap.

In conceiving of the present invention, it was discovered that the action of the air currents in a herringbone-type thrust bearing tends to collect wear particles at a central radial point within the bearing gap. FIG. 8 is a cross-sectional side view of the gap 54 between the lower surface 44 of the large diameter shaft portion 34 and the surface 42 of the lower thrust plate 22 illustrating this effect. As shown, inward radial air currents 70 and outward radial air currents 72 tend to collect wear particles 74 within the gap 54. A similar situation would exist in the upper gap 52. This collection of wear particles is undesirable as it can significantly reduce the performance of the bearing and may eventually result in seizure of the drive. In accordance with one aspect of the Present invention, as illustrated in FIG. 9, a groove ( pattern is implemented that forces air radially outward in the gap 54 past the outer edge of the thrust bearing. As shown, the "outward pumping" groove pattern generates radial air currents 76 that tend to blow wear particles from the gap 54 in an outward direction.

Figure 10:
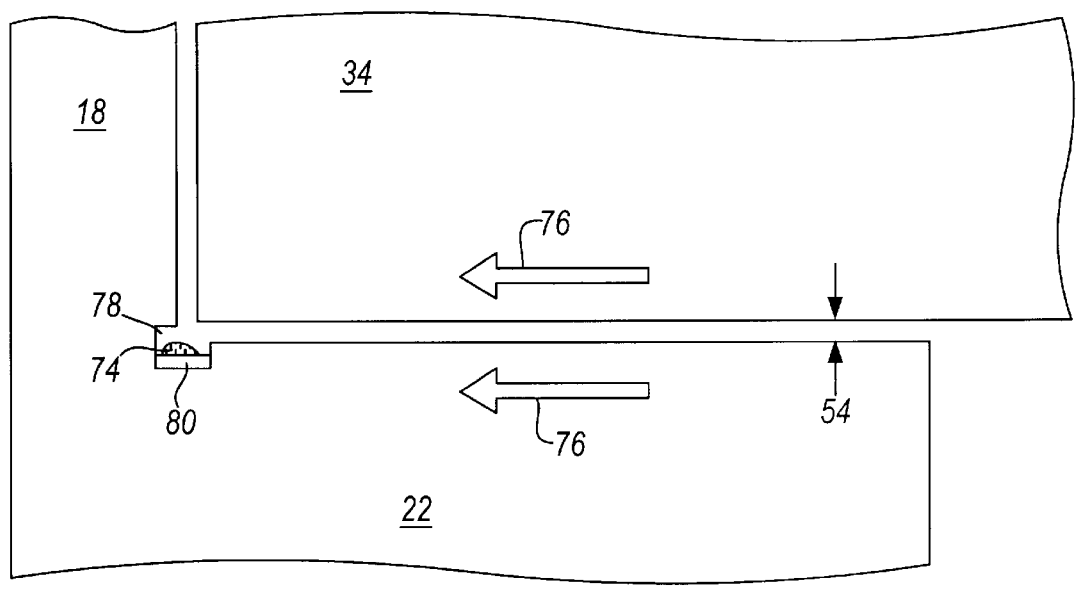

As illustrated in FIG. 9, a cavity 78 can be provided at the junction between the lower thrust plate 22 and the sleeve 18 to catch the wear particles that are blown from the gap 54 by the radial air currents 76. The cavity 78 can take virtually any shape, although a rectangular cavity 78 is probably the easiest to implement. As shown in FIG. 10, the cavity 78 can include a capture device 80 for holding the particles once they have been collected in the cavity 78. In one embodiment of the invention, for example, a sticky adhesive or resin is placed within the cavity 78 to hold the wear particles. Alternatively, or in addition, a magnetic material can be placed in the cavity 78 to hold any magnetic wear particles that are blown from the gap 54. Other particle retention devices are also possible. In an alternative arrangement, a capture device 80 is placed in a corner between the thrust plate 22 and the sleeve 18 without the benefit of an underlying cavity. It should be appreciated that an outward pumping groove pattern and wear particle collection functionality can also be implemented in the upper thrust bearing gap 52.

Figure 11:
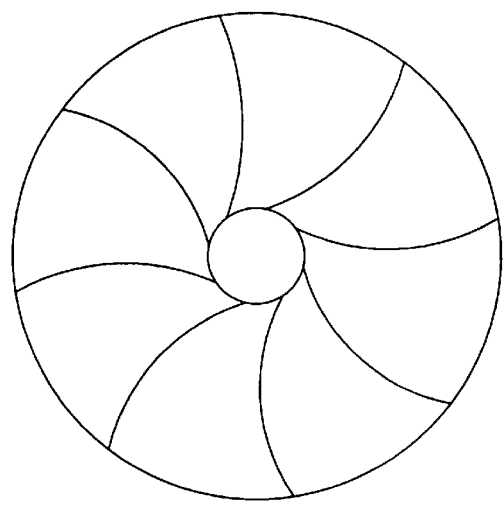
FIG. 11 is a top view of an air bearing surface having an outward pumping groove pattern in accordance with the present invention.

FIG. 11 is a diagram illustrating a groove pattern that can be used to generate the outward pumping air bearing in the gap 54. The groove pattern could be etched or machined into either the lower surface 44 of the large diameter shaft portion 34 or the surface 42 of the lower thrust plate 22. A similar pattern can also be used in the gap 52 of the upper thrust bearing. Although shown as lines for ease of illustration, the grooves will generally require some thickness to generate adequate air pressure. In addition, a significantly greater number of grooves than that shown will generally be necessary to create the air bearing.

Although the present invention has been described in conjunction with its preferred embodiments, it is to be understood that modifications and variations may be resorted to without departing from the spirit and scope of the invention as those skilled in the art readily understand. For example, the principles of the present invention can be used in connection with other fluid-type bearings, such as oil bearings. In addition, the inventive principles can be used to reduce surface contact and stiction in journal air bearings in addition to thrust bearings. Furthermore, the principles of the invention can be advantageously employed in other spin motor configurations, such as those having a non-stationary shaft. Such modifications and variations are considered to be within the purview and scope of the invention and the appended claims.

What is claimed is:

1. An air bearing assembly for use in a disk drive for supporting rotation of a medium carrying hub about a vertical axis of rotation, comprising:
    a first air bearing surface for facilitating generation of a thrust air bearing for supporting the medium carrying hub in a vertical direction during rotation of the medium carrying hub; and
    a second air bearing surface, substantially facing said first air bearing surface, for facilitating generation of said thrust air bearing during rotation of the medium carrying hub, said second air bearing surface moving with respect to said first air bearing surface during rotation of the medium carrying hub, wherein at least one of said first and second air bearing surfaces includes a plurality of spiral grooves for generating air pressure in a gap between said first and second air bearing surfaces during rotation of said medium carrying hub, wherein said plurality of spiral grooves are arranged to generate an outward pumping air current in said gap between said first and second air bearing surfaces that flows radially outward with respect to the vertical axis of rotation, wherein said outward pumping air current is operative for blowing wear particles out of said gap during rotation of said medium carrying hub.

2. The air bearing assembly of claim 1, wherein a height of said gap between said first air bearing surface and said second air bearing surface varies as a function of radial distance from the vertical axis of rotation while said medium carrying hub is rotating.

3. The air bearing assembly of claim 2, wherein:
said gap height increases with radial distance from the vertical axis of rotation over at least a portion of said first and second air bearing surfaces.

4. The air bearing assembly of claim 2, wherein:
said gap height is substantially constant in a circumferential direction with respect to the vertical axis of rotation at a particular radial distance from the vertical axis of rotation.

5. The air bearing assembly of claim 2, wherein:
said first air bearing surface is substantially planar and said second air bearing surface is curved over at least a portion thereof.

6. The air bearing assembly of claim 5, wherein:
said second air bearing surface is substantially spherical over a portion thereof.

7. The air bearing assembly of claim 2, wherein:
said second air bearing surface includes a sacrificial plating over a portion thereof, said sacrificial plating having a surface that is closer to said first air bearing surface than is any point on said second air bearing surface that does not include sacrificial plating.

8. The air bearing assembly of claim 7, wherein:
said surface of said sacrificial plating physically contacts said first air bearing surface when said medium carrying hub is at rest.

9. The air bearing assembly of claim 7, wherein:
said sacrificial plating is comprised of a first material and said first air bearing surface is comprised of a second material, wherein said first material is different from said second material.

10. The air bearing assembly of claim 9, wherein:
said second material is harder than said first material.

11. The air bearing assembly of claim 7, wherein:
said sacrificial plating forms a circular ring on said second air bearing surface, said circular ring being substantially centered on the axis of rotation of the medium carrying hub.

12. The air bearing assembly of claim 11, wherein:
said sacrificial plating is broken into a plurality of equally spaced portions within said circular ring.

13. The air bearing assembly of claim 12, further comprising:
means for collecting said wear particles that are blown from said gap.

14. The air bearing assembly of claim 13, wherein:
said means for collecting includes an adhesive material for bonding to said wear particles.

15. The air bearing assembly of claim 13, wherein:
said means for collecting includes a cavity for collecting said wear particles as they are blown from the gap.

16. The air bearing assembly of claim 13, wherein:
said means for collecting includes a magnetic material for holding wear particles that are blown from the gap using a magnetic field.

17. An air bearing assembly for use in a disk drive for supporting rotation of a medium carrying hub about a vertical axis of rotation, comprising:
    a first air bearing surface for facilitating generation of a thrust air bearing for supporting the medium carrying hub in a vertical direction during rotation of the medium carrying hub; and a second air bearing surface, substantially facing said first air bearing surface, for facilitating generation of said thrust air bearing during rotation of the medium carrying hub, said second air bearing surface moving with respect to said first air bearing surface during rotation of the medium carrying hub, wherein at least one of said first and second air bearing surfaces includes a plurality of spiral grooves for generating air pressure in a gap between said first and second air bearing surfaces during rotation of said medium carrying hub;

wherein, when said medium carrying hub is at rest, said first air bearing surface contacts said second air bearing surface at a single point along a radial distance from the vertical axis of rotation.

18. The air bearing assembly as claimed in claim 17, wherein:
said first air-bearing surface is substantially planar and said second air bearing surface is curved over at least a portion thereof.

19. The air bearing assembly as claimed in claim 17, wherein:
said second air bearing surface includes said plurality of spiral grooves.

20. The air bearing assembly as claimed in claim 17, wherein:
said first and second air bearing surfaces each include a plurality of spiral grooves.

21. The air bearing assembly as claimed in claim 17, wherein:
said plurality of spiral grooves are arranged to generate an outward pumping air current in said gap between said first and second air bearing surfaces, said outward pumping air current having a component that flows radially outward with respect to said axis of rotation, wherein said outward pumping air current forces air radially outward past an outer edge of at least one of said first air bearing surface and said second air bearing surface.

22. An air bearing assembly for use in a disk drive for supporting rotation of a medium carrying hub about a vertical axis of rotation, comprising:
a first air bearing surface, having a first surface area, for facilitating generation of a thrust air bearing for supporting the medium carrying hub in a vertical direction during rotation of the medium carrying hub;
a second air bearing surface, having a second surface area, substantially facing said first air bearing surface, for facilitating generation of said thrust air bearing during rotation of the medium carrying hub, said second air bearing surface moving with respect to said first air bearing surface during rotation of the medium carrying hub, wherein at least one of said first and second air bearing surfaces includes a plurality of grooves for generating air pressure in a gap between said first and second air bearing surfaces during rotation of said medium carrying hub, wherein said plurality of grooves are arranged to generate an outward pumping air current in said gap between said first and second air bearing surfaces that flows radially outward with respect to the vertical axis of rotation, wherein said outward pumping air current forces air radially outward past an outer diameter of at least one of said first air bearing surface and said second air bearing surface, wherein said outward pumping air current is operative for blowing particles out of said gap during rotation of said medium carrying hub; and
means for collecting said wear particles that are blown from said gap.

23. The air bearing assembly of claim 22, wherein:
said second air bearing surface includes a sacrificial plating over a portion thereof, said sacrificial plating having a surface that is closer to said first air bearing surface than is any point on said second air bearing surface that does not include sacrificial plating.

24. The air bearing assembly of claim 23, wherein:
said surface of said sacrificial plating physically contacts said first air bearing surface when said medium carrying hub is at rest.

25. The air bearing assembly of claim 23, wherein:
said sacrificial plating is comprised of a first material and said first air bearing surface is comprised of a second material, wherein said first material is different from said second material.

26. The air bearing assembly of claim 25, wherein:
said second material is harder than said first material.

27. The air bearing assembly of claim 23, wherein:
said sacrificial plating forms a circular ring on said second air bearing surface, said circular ring being substantially centered about the axis of rotation of the medium carrying hub.

28. The air bearing assembly of claim 27, wherein:
said sacrificial plating is broken into a plurality of equally spaced portions within said circular ring.

29. The air bearing assembly of claim 22, wherein:
said means for collecting includes an adhesive material for bonding to said wear particles.

30. The air bearing assembly of claim 22, wherein:
said means for collecting includes a cavity for collecting said wear particles as they are blown from the gap.

31. The air bearing assembly of claim 22, wherein:
said means for collecting includes a magnetic material for holding wear particles that are blown from the gap using a magnetic field.

32. A method for evacuating wear particles from an air bearing, comprising:
providing first and second air bearing surfaces at least one of said first and second ABS having a plurality of spiral grooves;
rotating said first air bearing surface relative to said second air bearing surface;
creating air pressure in a gap between said first and second air bearing surfaces during said rotating step;
using said spiral for grooves generating a directional air current in said gap during said rotating step, forcing air radially outward past an outer diameter of at least one of said first air bearing surface and said second air bearing surface; and
collecting wear particles blown out of said gap during said generating step.

33. The method of claim 32, wherein said collecting step comprises:
providing a cavity for collecting said wear particles that are blown from said gap.

34. The method of claim 32, wherein said collecting step comprises:
providing an adhesive material for bonding to said wear particles that are blown from said gap.

35. The method of claim 32, wherein said collecting step comprises:
providing a magnetic material for holding said wear particles that are blown from said gap using a magnetic field.

* * * * *